Feb. 14, 1928.
F. CORNIL
1,659,517
CONVERTIBLE VEHICLE
Filed Sept. 7, 1926 4 Sheets-Sheet 1
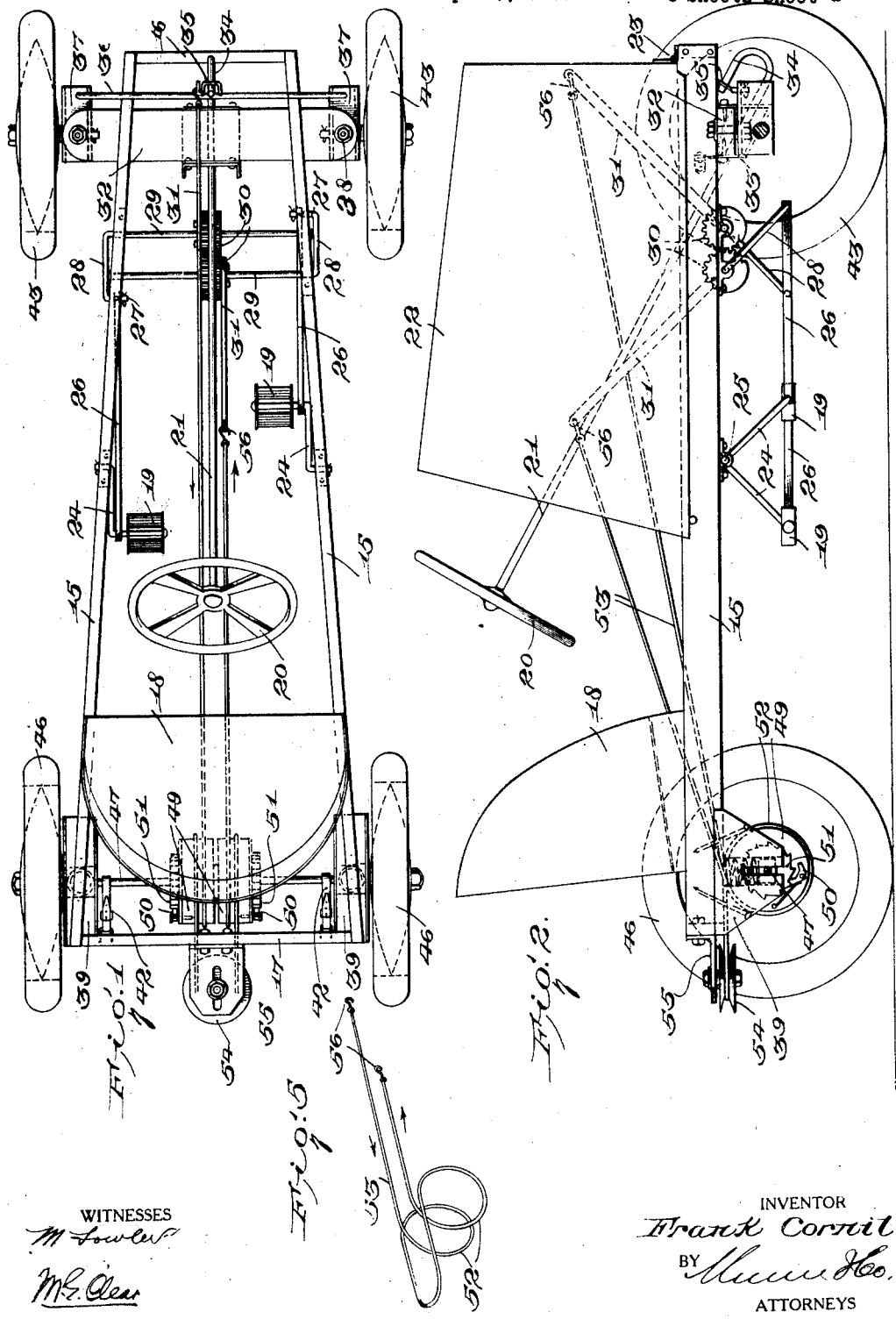

Feb. 14, 1928.
F. CORNIL
CONVERTIBLE VEHICLE
Filed Sept. 7, 1926
1,659,517
4 Sheets-Sheet 2
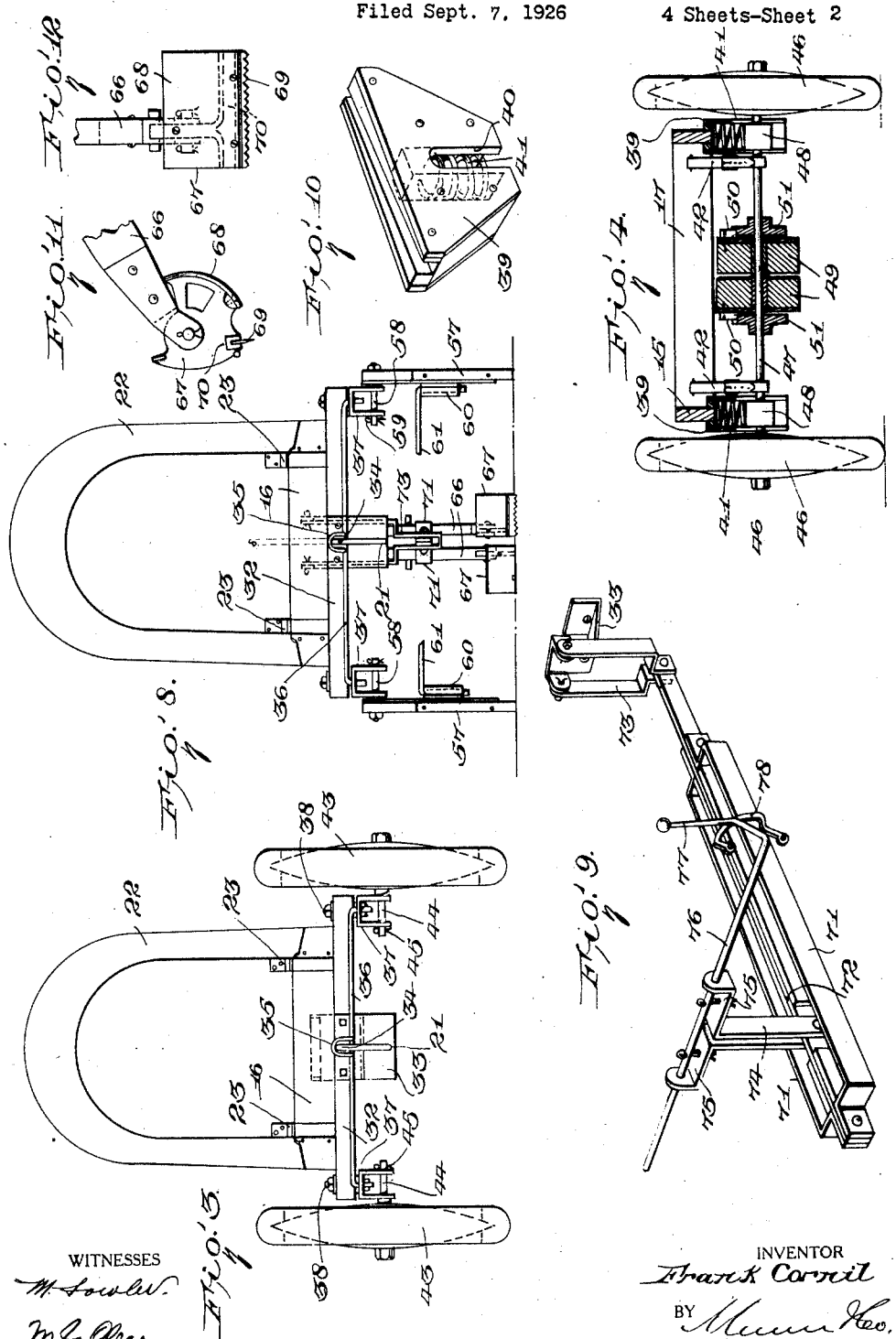
INVENTOR
Franck Cornil
BY
ATTORNEYS.

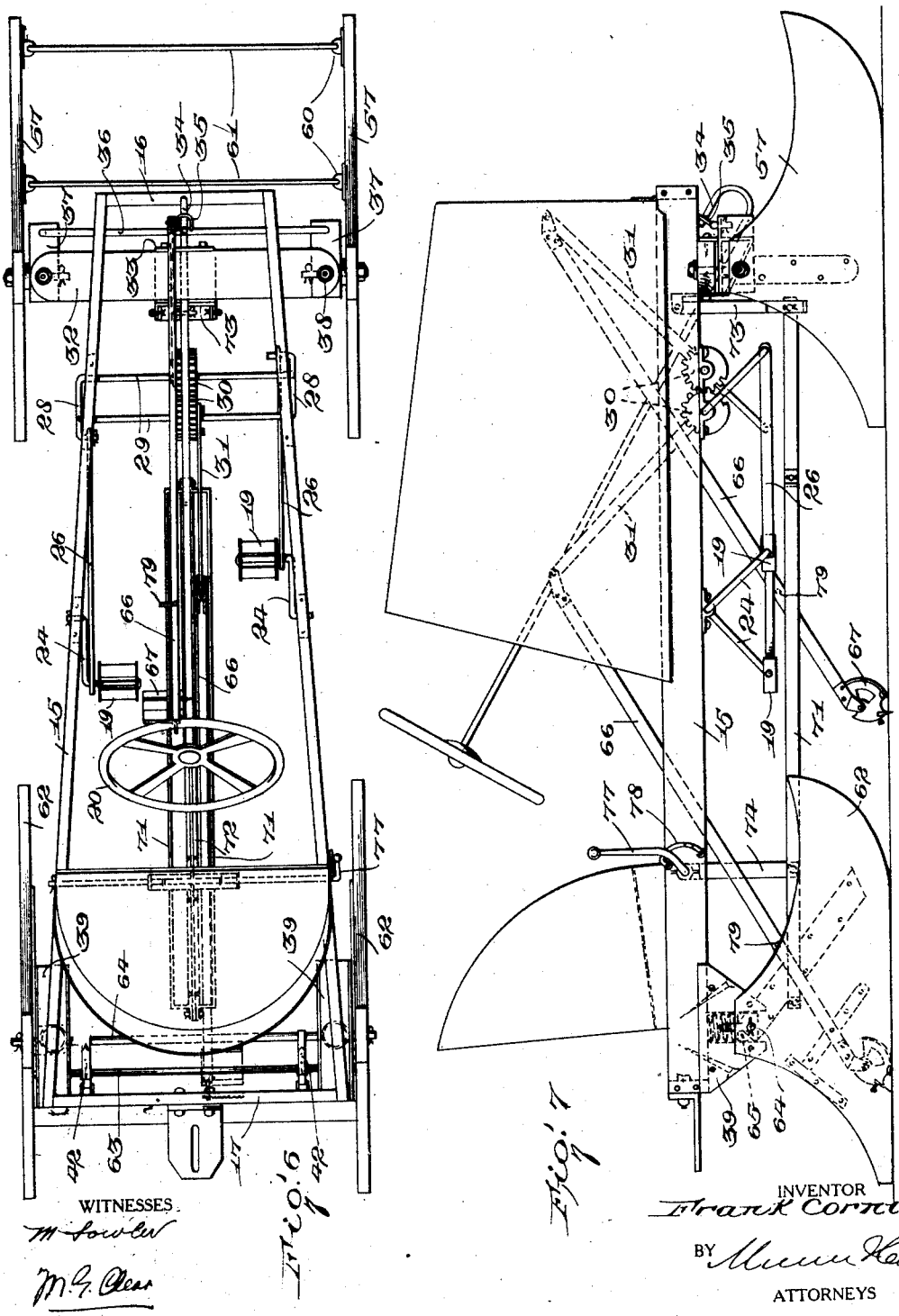

Feb. 14, 1928.                                          1,659,517
F. CORNIL
CONVERTIBLE VEHICLE
Filed Sept. 7, 1926                          4 Sheets-Sheet 4
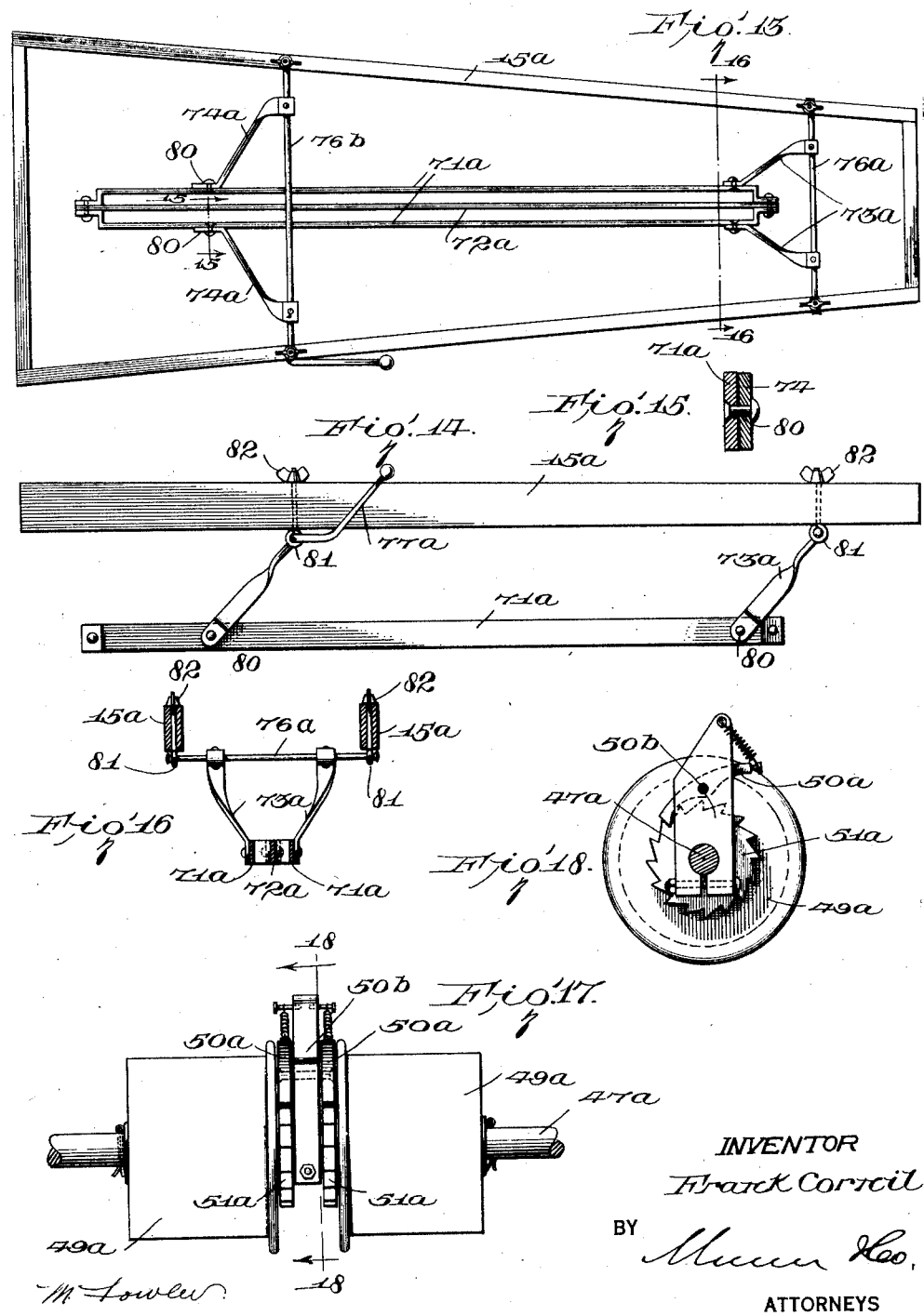

Patented Feb. 14, 1928.

1,659,517

UNITED STATES PATENT OFFICE.

FRANK CORNIL, OF OWOSSO, MICHIGAN.

CONVERTIBLE VEHICLE.

Application filed September 7, 1926. Serial No. 134,062.

My present invention relates generally to vehicles for children's use and more particularly to convertible vehicles, my primary object being the provision of a vehicle which may be quickly and easily changed to either roll on wheels or slide on runners.

A further object is the provision of a sturdy lasting vehicle which may be foot-propelled in either of its convertible forms and which lends itself to ready coasting in either use.

A still further object is the provision of a novel steering mechanism which lends itself to either form and in which the ground engaging members (wheels or runners) are utilized in pairs at the front and rear and connected in substantially the same manner to the same supporting parts of the vehicle frame.

With the above general objects in mind, the further and more specific objects of my invention together with the resulting advantages thereof will appear in the course of the following description, reference being had to the accompanying drawings, which form a part of this specification, and in which:

Figure 1 is a top plan view of the vehicle showing the use of wheels;

Figure 2 is a side view thereof;

Figure 3 is a front elevation.

Figure 4 is a vertical transverse section taken along the center line of the rear wheel axle;

Figure 5 is a perspective diagram of the flexible driving connection.

Figure 6 is a top plan view of the vehicle showing the same with runners;

Figure 7 is a side elevation thereof;

Figure 8 is a front elevation thereof;

Figure 9 is a detail perspective view showing the push bar guides and the hand control therefor;

Figure 10 is a detail perspective view of one of the rear assembly supports.

Figures 11 and 12 are respectively a side and a front view of one of the propeller shoes.

Figures 13 and 14 are respectively a top plan and side view showing a modified arrangement for the support of the thrust bar guides.

Figures 15 and 16 are transverse sectional views taken respectively on lines 15—15 and 16—16 of Figure 13.

Figure 17 is a rear elevation of a modified drum actuating arrangement, and Figure 18 is a detail section taken on line 18—18 of Figure 17.

Referring now to these figures, the parts common to both forms of the vehicle or in other words used in connection with both wheels and runners will be referred to by the same numerals in the several figures and include a main frame having side members or bars 15, and front and rear members or bars 16 and 17 respectively. As shown in Figures 1 and 6 in particular, the side bars 15 incline toward one another or converge in a forward direction, the rear bar 17 being somewhat longer than the front bar 16.

Across the side bars 15 forwardly of, and adjacent to, the rear bar 17, is a seat 18 to be occupied by the driver of the vehicle whose feet are extended forwardly below the level of the main frame to engage pedals 19. Immediately in front of the driver's seat 18 is the steering wheel 20 upon the upper rear end of the steering shaft or post 21. A hood 22 preferably in one piece, covers the forward portion of the frame and is hinged at its forward end as at 23 to the forward frame bar 16 so that it may be raised upwardly and forwardly whenever for any reason it is desired to expose those parts which the hood normally protects and conceals.

The foot pedals 19 are turnably mounted upon the lower inturned ends of cranks 24 journalled at their upper ends in bearings 25 beneath the side bars 15. These cranks are joined by forwardly extending connecting rods 26 with the lower inturned extremities 27 of the angular outer ends 28 of a pair of parallel cross shafts 29. Adjacent to their centers, these shafts 29 have intermeshing gears 30 and the gears are provided at opposite sides with upstanding propelling levers 31 which are thus spaced laterally from one another and swing forwardly and rearwardly within the hood 22 when the pedals 19 are alternately thrust forward by foot power. This movement of the levers is moreover synchronized by virtue of the connecting gears 30 of the cross shafts 29 which compels the return movement of each pedal as the other pedal is thrust forward.

Below and across the side bars 15 adjacent to the front bar 16 of the frame, is a rigid beam 32 and fixed to this beam at its center is a journal bracket 33 through which the lower forward end of the steering shaft or post 21 has bearings at spaced points. The forwardly projecting end of post 21 has a portion 34 bent back upon itself and extended through a central U-shaped lug 35 of a tie-bar 36 whereby rotation of the steering post will thus shift the tie-bar 36 in the direction of its length transversely of the main frame. To the ends of the cross beam 32 beyond the side bars 15 a pair of short U-shaped supports 37 are pivotally connected at their rear ends by vertically extending pivot bolts 38. To the forward ends of these supports 37 the outer ends of the tie-bar 36 are pivotally connected. Below their pivot bolts 38 and vertically in line therewith, the depending sides of the supports 37 have openings to receive pins projecting inwardly from the forward side ground engaging members as will be presently described.

To the rear portions of the side bars 15 adjacent to the rear bar 17 a pair of transversely alined rear supports 39, one of which is seen in Figure 10, are rigidly secured. Each of these supports has an upwardly extending squared bore and vertical slots 40 at the sides of its bore, and each support has within its bore a coiled spring 41 serving as a resilient support for the rear assembly of ground engaging members to be hereinafter described. Moreover the rear bar 17 of the frame has at spaced points U-shaped hooks in which straps 42 are anchored, these straps serving a purpose which will presently appear.

Where, as in Figures 1 to 5 inclusive, the vehicle is utilized with wheels, the front wheels 43 have their spindles provided with short extensions 44 for disposition through the before-mentioned openings of the front supports 37, and normally held by cotter pins or similar readily detachable fastenings 45. The front wheels are thus shiftable for steering purposes through the pivotal movements of the supports 37 brought about by the steering connections as previously described. The rear wheels 46 are secured upon the ends of a rear shaft 47 and this shaft has adjacent to the wheels 46, square bearing blocks 48 in which it is rotatable. These bearing blocks 48 are adapted to movably fit within the bores of the rear supports 39 as most plainly shown in Figure 4 so as to engage the springs 41. The shaft 47 extends through the slots 40 of said supports 39 and inwardly beyond the supports 39 the shaft 47 is engaged by the straps 42 which serve to limit its downward movement with respect to the main frame so as to prevent the bearing blocks 48 from dropping out of the supports 39.

Adjacent to its center, the shaft 47 has a pair of drums 49 loose thereon, and as shown in Figure 4, each drum has at its outer side a pawl or dog 50 adapted, upon forward rotation of the drums, to engage ratchet wheels 51 securely fastened to the shaft 47 at the sides of the drums. In this way the rear wheels 46 may be driven upon forward rotation of the drums 49 while free to independently rotate in a forward direction as when coasting. This arrangement may be varied however, by utilizing spaced apart drums $49^a$ shown in Figures 17 and 18 loose upon the shaft $47^a$ and provided with ratchet wheels $51^a$ fixed thereto at their inner adjacent ends. In this event the ratchet wheels $51^a$ will be engaged by pawls or dogs $50^a$ pivoted upon a support $50^b$ clamped to the shaft $47^a$ between the drums.

The drums 49 or $49^a$ are rotated by virtue of single turns 52 of a flexible propelling connection or cable 53 thereon. These turns of the cable are in opposite directions and between them the cable 53 passes around a horizontal idler pulley 54 adjustably mounted in a bracket 55 outstanding rearwardly from the rear frame bar 17 as plainly shown in Figures 1 and 2. The free ends of the cable are extended upwardly and forwardly and provided at their terminals with hooks 56 to engage the upper apertured ends of the propelling levers 31. Thus upon actuation of the foot pedals the rear shaft 47, and consequently the rear wheels 46, will be driven through the drums 49 in alternation.

Where as in Figures 6, 7 and 8, the vehicle is to be used with runners as a sled or coaster, a front truck is made up of parallel side runners 57 having inwardly projecting pins 58 to extend through the apertures of the front supports 37 and normally held by cotter pins 59 or similar detachable fastenings which obviously permits ready interchange of the front truck having wheels and runners. The runners 57 are thus steered the same as the wheeled truck before described and preferably project forwardly of the main frame, their forward portions having vertical tubular bearings 60 to receive the down-turned end portion of cross braces 61.

The rear sled truck likewise includes side runners 62 connected by a brace bar 63 and also connected by a bar 64 equivalent to the shaft of the rear wheeled truck. Bar 64 has square bearing blocks 65 for disposition in the bores of the rear supports 39 and is engaged by the straps 42 in the same manner as the wheel shaft 47, so as to hold the same against displacement.

In propulsion, the frame with sled trucks is somewhat different, thrust bars 66 being employed in pivotal connection at their upper forward ends with the upper ends of the propelling levers 31. These thrust bars extend downwardly and rearwardly through the frame and have ground engaging propelling shoes 67 pivotally connected to their lower rear ends to rock forwardly and rearwardly. Each of these shoes has a forward convex slide surface 68 which is shifted into engagement with the surface of the ground when the respective thrust bar is drawn forwardly. Each shoe has rearwardly of its convex surface 68 a transverse blade 69 provided with a serrated ground engaging edge and detachably secured in a blade holder 70 so as to shift into engagement with the ground when the respective thrust bar is forced rearwardly. It is obvious that effective driving engagement is thus to be had in connection with ice and snow-covered surfaces upon which the vehicle with sled trucks is used. It is also obvious that by virtue of the convex slide surfaces of the propelling shoes, the vehicle may be permitted to coast whenever it is desired.

The thrust bars 66 operate between parallel guide strips 71, shown in Figures 6, 7, 8 and 9, and at opposite sides of a center guide strip 72 to which the strips 71 are attached at their ends. The center strip 72 is supported beneath the central portion of the vehicle frame by hangers 73 and 74 to which it is pivotally connected. The front hanger 73 is detachably pivoted to the bracket 33 forming the journal support for the lower end of the steering shaft or post 21, while the rear hanger 74 has its upper angular ends 75 pinned to the central portion of a cross shaft 76. This cross shaft is journalled through the frame side bars 15 and has at one end a crank or lever 77 which upon being thrust forwardly and downwardly by the operator, rocks the cross shaft 76 and swings the hanger 74 and consequently the guide and center strips 71 and 72 upwardly and rearwardly toward the vehicle frame. A spring catch 78 serves to hold the lever 77 and the other parts in the position last described. The thrust bars 66 have laterally projecting pins 79 intermediate their ends which in the normal operation are positioned above the guide strips 71 and it will thus be seen that when the guide strips are shifted upwardly and rearwardly by downward movement of the lever 77, the pins 79 will be engaged and the thrust bars 66 will be lifted and the ground engaging shoes 67 will be elevated safely from the ground whenever this is desirable as in coasting over rough ice or snow or transporting the vehicle from place to place.

Figures 13 to 16 inclusive show a possible modification as to the support of the above-mentioned thrust bar guides, the guide strips 71ª and 72ª of these latter figures being rigidly riveted to one another at their ends and being loosely riveted at 80 (see Figure 15) to the lower ends of the hangers 73ª and 74ª. These hangers 73ª and 74ª are rigidly connected at their upper ends to the forward and rear cross shafts 76ª and 76ᵇ and these shafts are journalled at their ends in the lower eyes 81 of eye-bolts upstanding through the frame side bars 15ª. These eye-bolts are normally held by upper wing nuts 82 which thus form a readily removable connection for the entire guide arrangement of the thrust bars. The free ends of these cross shafts 76ª and 76ᵇ are headed as shown in Figure 16 although one end of the rear cross shaft 76ᵇ has an extension forming an upstanding handle or lever 77ª by means of which the thrust bars and their guides may be elevated as previously described.

It is thus apparent that my invention provides a convertible vehicle in which the interchange from wheeled to sled trucks and vice versa may be easily and quickly made, as well as one in which the necessary parts incident to such operation is reduced to a minimum. It is further apparent that the vehicle is not only adapted to effectively and efficiently carry out the object of my invention first above stated but will be strong and durable and is well calculated to afford convenience and pleasure in use.

I claim:

1. A vehicle having ground engaging members, means for supporting said members in connection with the vehicle, and driving means including swinging foot pedals, a pair of swinging propelling levers separate from the foot pedals, operative connections between the levers and pedals, including intermeshing gears between the levers whereby to synchronize their relatively opposite movements, and means operated by said levers whereby the vehicle will be propelled.

2. A vehicle including a rear rotatable shaft having ratchet drums thereon, foot actuated propelling means including a pair of upwardly projecting and swinging levers, and a single flexible connection engaged at its ends with the upper ends of said levers and having its intermediate portion coiled around the drums in relatively opposite directions.

3. A vehicle including a rear rotatable shaft having ratchet drums thereon, foot actuated propelling means including a pair of swinging levers, and a single flexible connection engaged at its ends with said levers and having spaced coils around the drums in relatively opposite directions, and a guide pulley around which said flexible connection is extended between the said coils.

4. A vehicle including a propelling mechanism consisting of a pair of push bars, and ground engaging shoes pivoted to the push bars, each shoe having a convex surface at its forward portion and a rear transverse blade.

5. A vehicle including a propelling mechanism consisting of a pair of push bars, and ground engaging shoes pivoted to the push bars, each shoe having a convex surface at its forward portion and a rear transverse blade, guides in which said push bars operate, and vertically adjustable supports for said guides, the push bars having portions engageable by the guides whereby to elevate the push bars with the guides.

6. In a vehicle, a frame, ground engaging members for supporting the frame, and a driving means, said means including swinging foot pedals, a pair of swinging propelling levers separate from the foot pedals, and operative connections between the levers and pedals and including intermeshing gears.

7. In a vehicle, a frame, ground engaging members for supporting the frame, swinging foot pedals, cross shafts having cranks at their end with which the pedals are connected, intermeshing gears on said shafts, and propelling levers secured to said shafts.

8. In a vehicle, a frame, ground engaging members supporting the frame, pedals mounted on the frame, crank shafts mounted in the frame, means connecting each pedal with a crank shaft, intermeshing gears on the crank shafts and propelling levers, each secured to a gear.

9. In a vehicle, a frame, ground engaging members for supporting the frame, pedals mounted on the frame, one at each side, two shafts mounted in the frame and each having a crank at one end, rods connecting the pedals with the cranks of said shafts, intermeshing gears on the shafts, two levers each secured to a gear, and means connected with and operated by said levers, whereby the vehicle will be propelled.

FRANK CORNIL.